United States Patent
Demski et al.

(10) Patent No.: US 12,194,915 B2
(45) Date of Patent: *Jan. 14, 2025

(54) METHOD OF COMMUNICATING BETWEEN WORK MACHINES USING LI-FI COMMUNICATION PROTOCOL

(71) Applicant: DEERE & COMPANY, Moline, IL (US)

(72) Inventors: Nathan R. Demski, Durango, IA (US); Eric A. Keen, Manhattan, KS (US); Brian M. Huenink, Cedar Grove, WI (US); Michael R. Gratton, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,668

(22) Filed: Sep. 6, 2023

(65) Prior Publication Data

US 2024/0059211 A1   Feb. 22, 2024

Related U.S. Application Data

(63) Continuation of application No. 17/116,030, filed on Dec. 9, 2020, now Pat. No. 11,752,926.

(51) Int. Cl.
*B60Q 1/24* (2006.01)
*A01B 76/00* (2006.01)
(Continued)

(52) U.S. Cl.
CPC .............. *B60Q 1/245* (2013.01); *A01B 76/00* (2013.01); *B60Q 1/0023* (2013.01);
(Continued)

(58) Field of Classification Search
CPC ........ B62D 33/06; A01B 76/00; B60Q 1/247; H04B 10/11
See application file for complete search history.

(56) References Cited

U.S. PATENT DOCUMENTS 10,134,280 B1   11/2018   You
10,195,980 B2   2/2019   Widdowson et al.
(Continued)

FOREIGN PATENT DOCUMENTS

CN   106043104 A   10/2016
CN   205847277 U   12/2016
(Continued)

OTHER PUBLICATIONS

German Search Report issued in application No. DE102021201355.4; Date: Nov. 11, 2021; pp. 7.

*Primary Examiner* — Christopher E Dunay
(74) *Attorney, Agent, or Firm* — Taft Stettinius & Hollister LLP; Stephen F. Rost

(57) ABSTRACT

An agricultural work vehicle includes a chassis, a cab mounted to the chassis and including a work space for an operator to control the work vehicle, and a controller for controlling operation of the work vehicle. The work vehicle further includes a lighting system having at least one array field light for illuminating an area on or around the work vehicle. A light control module is disposed in electrical communication with the controller and is configured to operably control the at least one array field light. The controller transmits a signal to the light control module, and the at least one array field light transmits a light signal corresponding to the signal which is receivable by a receiving module on another work vehicle or implement.

18 Claims, 4 Drawing Sheets

(51) Int. Cl.
  *B60Q 1/00* (2006.01)
  *B62D 21/02* (2006.01)
  *B62D 33/06* (2006.01)
  *H04B 10/11* (2013.01)

(52) U.S. Cl.
  CPC ............ *B60Q 1/0035* (2013.01); *B60Q 1/247* (2022.05); *B62D 21/02* (2013.01); *B62D 33/06* (2013.01); *H04B 10/11* (2013.01); *B60Q 2300/47* (2013.01); *B60Q 2400/20* (2013.01); *B60Q 2800/20* (2022.05)

(56) References Cited

U.S. PATENT DOCUMENTS

| | | |
|---|---|---|
| 10,538,195 B2 | 1/2020 | Fritz et al. |
| 11,444,697 B2 | 9/2022 | Schott et al. |
| 11,827,286 B2 | 11/2023 | Demski et al. |
| 2005/0016787 A1* | 1/2005 | Lesesky ............ H04B 10/1143 180/311 |
| 2007/0233348 A1 | 10/2007 | Diekhans et al. |
| 2009/0222160 A1 | 9/2009 | Morselli et al. |
| 2018/0009367 A1* | 1/2018 | Lee ..................... F21S 41/125 |
| 2018/0056851 A1* | 3/2018 | Kim ..................... B60Q 1/143 |
| 2018/0279539 A1 | 10/2018 | Wägner |
| 2020/0177276 A1* | 6/2020 | Lakshmanan ........ H04B 10/112 |
| 2020/0370890 A1* | 11/2020 | Hamilton ................ G08G 1/04 |
| 2020/0389196 A1* | 12/2020 | Choi ..................... H04H 20/53 |
| 2021/0339809 A1 | 11/2021 | Demski et al. |

FOREIGN PATENT DOCUMENTS

| | | |
|---|---|---|
| DE | 19839881 A1 | 3/2000 |
| DE | 102015104928 A1 | 10/2016 |
| EP | 3413276 A1 | 12/2018 |

\* cited by examiner

METHOD OF COMMUNICATING BETWEEN WORK MACHINES USING LI-FI COMMUNICATION PROTOCOL

RELATED APPLICATIONS

This application is a continuation of U.S. patent application Ser. No. 17/116,030, filed Dec. 9, 2020, entitled "METHOD OF COMMUNICATING BETWEEN WORK MACHINES USING LI-FI COMMUNICATION PROTOCOL," the disclosure of which is hereby incorporated by reference in its entirety.

FIELD OF THE DISCLOSURE

The present disclosure relates to a lighting system of a work vehicle, and in particular, to using the lighting system to communicate between work vehicles, implements and the like.

BACKGROUND

Lighting systems on vehicles are well known and perform numerous tasks. In some instances, conventional lighting systems for on-road vehicles may adjust lighting levels on the basis of a travel path or intended travel path of a vehicle. These lighting systems can offer guidance to an operator who is controlling the steering and operation of the vehicle.

In some ways, these conventional lighting systems are being used similarly in off-road vehicles such as agricultural machines, construction or industrial machines, and forestry machines. As technology continues to evolve and is added to these types of machines, greater amounts of data and information is collected and transferred between vehicles, vehicle-implement, etc. In an agricultural setting, for example, data and information may be communicated tractor-to-tractor, tractor-to-harvester, and tractor-to-implement. Conventional wired communication protocols are challenged to keep up with both the amount of data as well as the speed that this data transfer is being requested to be communicated. Moreover, machine-to-machine communication via global positioning sensors (GPS) also relies on signal and speed to upload and download information via a satellite.

It is therefore desirable to provide an improved communication protocol such that greater data transfer at higher speeds can be achieved between machines and/or implements.

SUMMARY

In one embodiment of the present disclosure, an agricultural work vehicle includes a chassis; a cab mounted to the chassis and including a work space for an operator to control the work vehicle; a controller for controlling operation of the work vehicle; a lighting system of the work vehicle comprising at least one array field light for illuminating an area on or around the work vehicle; a light control module disposed in electrical communication with the controller, the light control module configured to operably control the at least one array field light; wherein, the controller transmits a signal to the light control module; further wherein, the at least one array field light transmits a light signal corresponding to the signal which is receivable by a receiving module on another work vehicle or implement.

In one example of this embodiment, the at least one array field light comprises a high-definition pixel LED lighting module. In a second example, the transmission of the light signal comprises an optical data transmission. In a third example, the at least one array field light is mounted to the cab or chassis. In a fourth example, the at least one array field light comprises a first array field light and a second array field light, the first and second array field lights being independently controllable by the light control module.

In a fifth example, the first array field light is operably controlled to transmit a first light signal and the second array field light is operably controlled to transmit a second light signal, the first light signal and second light signal comprising different information. In a sixth example, a receiving module is disposed in electrical communication with the controller, the receiving module configured to receive a light signal from a light-transmitting module. In a seventh example, the receiving module comprises a photodetector. In an eighth example, a signal converter is electrically coupled to the receiving module, the signal converter capable of converting the light signal into a readable format by the controller.

In another embodiment of the present disclosure, a work vehicle for operating in a field includes a controller for controlling the work vehicle; a receiving module disposed in electrical communication with the controller, the receiving module configured to receive one or more light signals from a light-transmitting module on an implement or another work vehicle; a lighting system of the work vehicle comprising at least one light-transmitting module; a light control module disposed in electrical communication with the controller, the light control module configured to operably control the at least one light-transmitting module; wherein, the controller transmits a signal to the light control module; wherein, the at least one light-transmitting module transmits a light signal corresponding to the signal to the implement or other work vehicle.

In one example, the signal comprises data or position information about the work vehicle. In a second example, the transmission of the light signal comprises an optical data transmission. In a third example, the at least one light-transmitting module comprises a first light-transmitting module and a second light-transmitting module, the first and second light-transmitting modules being independently controllable by the light control module. In a fourth example, the first light-transmitting module is operably controlled to transmit a first light signal and the second light-transmitting module is operably controlled to transmit a second light signal, the first light signal and second light signal comprising different information. In another example, the receiving module comprises a signal converter configured to convert a light signal receiving from the implement or other vehicle into a readable format for the controller.

In a further embodiment of the present disclosure, a work vehicle and implement system includes a work vehicle comprising a controller, a light system including a light control module and at least one light-transmitting module, and a receiving module; and an implement operably coupled to the work vehicle, the implement comprising an implement controller, an implement light system including an implement light control module and at least one implement light-transmitting module, and an implement receiving module; wherein, the controller and implement controller communicate information therebetween via a communication protocol comprising the transmission of light signals by the light system and the implement light system.

In one example of this embodiment, the controller transmits a signal to the light control module; the light control module operably controls an output of the at least one light-transmitting module to transmit a light signal to the implement receiving module, the light signal corresponding to the signal; and the implement receiving module converting the light signal into a readable format for the implement controller. In another example, the receiving module and the implement receiving module comprise a signal converter for converting a light signal into a readable format for the respective controller and implement controller.

In a further example of this embodiment, the communication protocol comprises a primary communication protocol and a secondary communication protocol for transmitting information between the controller and implement controller; wherein the primary communication protocol comprises a smaller bandwidth than the secondary communication protocol; wherein the secondary communication protocol comprises the transmission of the light signals between the work vehicle and implement. In yet a further example, the controller or implement controller operably detect an amount of bandwidth being used in communicating information therebetween; further wherein, when the controller or implement controller determine the amount of bandwidth is below a threshold bandwidth, the controller or implement controller operably switch from communicating via the primary communication protocol to the secondary communication protocol.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
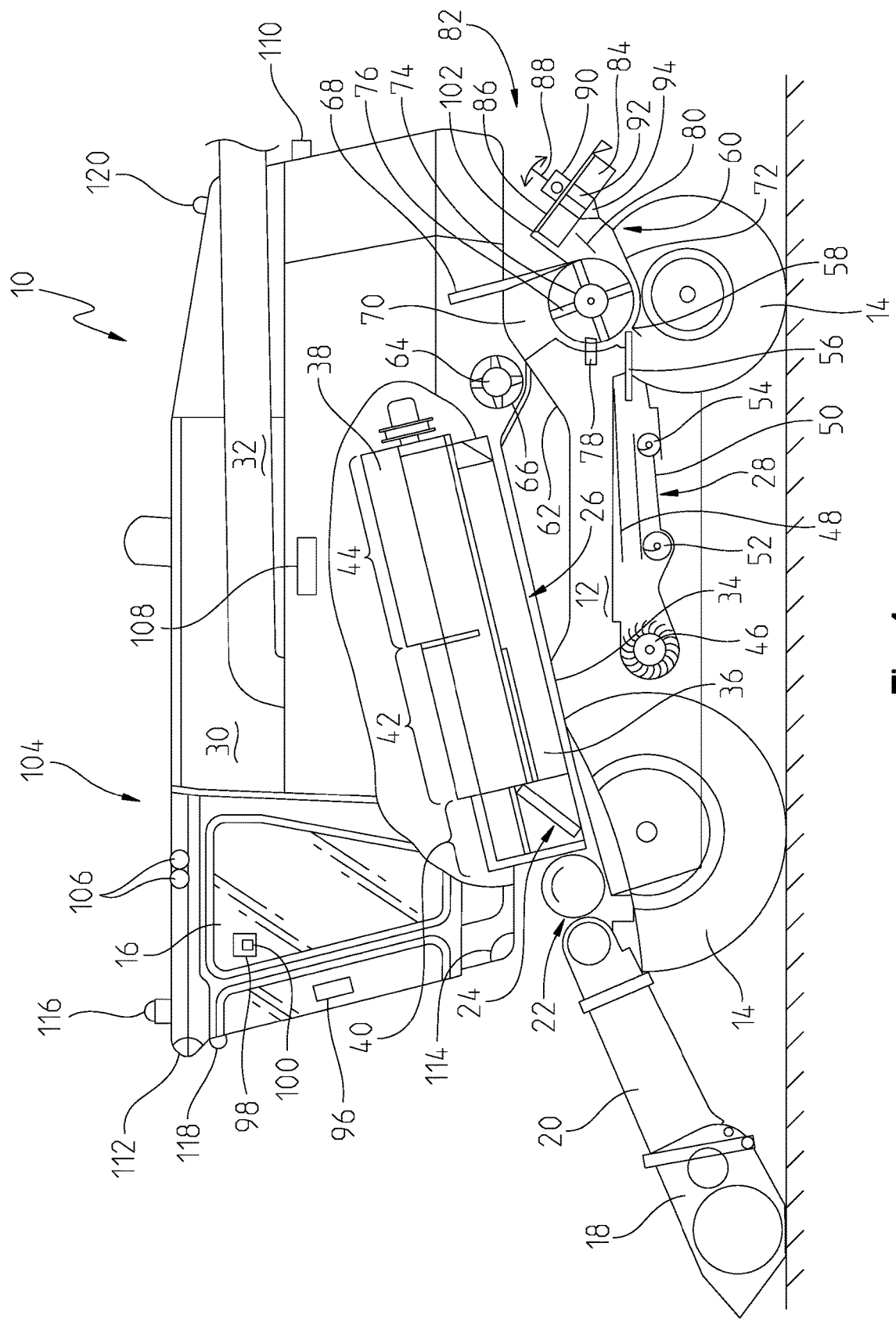
FIG. 1 is a partial section of a side view of an agricultural vehicle with a lighting system according to the present disclosure.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an illustrative example is provided of a work machine. In this example, the work machine is depicted as an agricultural vehicle, and in particular, to an agricultural combine 10. The present disclosure, however, is not limited to a combine or any other agricultural vehicle. The work machine or vehicle may be any type of agricultural, construction, forestry, industrial, or off-road machine or vehicle. Moreover, the terms "machine" and "vehicle" are used interchangeably in this disclosure to refer to the same thing.

In the embodiment of FIG. 1, an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls including an operator terminal or controls 96 for controlling the operation of the combine 10. A cutter head 18 may form part of an implement attached to the combine 10. Alternatively, the cutter head 18 may form part of the combine and thus is mounted to the chassis 12. In any event, the cutter head 18 may be disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

In FIG. 1, the agricultural vehicle 10 may include a lighting module or system 104 which is an integral part of the vehicle. The lighting module or system 104 may utilize a high-definition (HD) pixel or pixel light-emitting diode (LED) light array module. The system 104 may include its own control module 224 (see FIG. 2). The light system control module or controller 224 may be operably disposed in electrical communication with a vehicle controller 222, which controls the operation of the vehicle 10. The vehicle controller 222 may send communications or signals to the control module 224 for controlling the lighting system 104.

With matrix lighting, a vehicle controller may use a high beam and a low beam to illuminate the vehicle surroundings. With matrix lighting control, the controller may turn off the high beam and create a darkened column in the area where an oncoming vehicle or object is so as to not blind the vehicle (or person). With HD LED or HD Pixel source LED illumination, pixel technology is utilized in which more focused areas can be illuminated or de-illuminated based on need. Rather than using a single bulb, for example, the lighting system of the present disclosure may control individual pixels or pixel segments to project or illuminate. Individual segments may include between a thousand to over a million pixels, and the lighting system controller or control module 224 may operably enable or disable individual segments during operation. Moreover, the control module 224 may vary the intensity of the individual segments to project information or other communications onto the field as will be described below with reference to FIGS. 3 and 4.

The lighting system may be formed by an ambient or working lighting of the vehicle or an illumination provided inside the cab 16 in the form of illuminatable control and display elements or interior lighting. The working lighting may include a plurality of field lights mounted to the vehicle at different locations. In one example, each of the plurality of field lights may comprise a LED array field light. Other technology besides LED may be used for the field lights. The plurality of field lights may include a first field light 106, a second field light 108, a third field light 110, a fourth field light 112, and a fifth field light 114. In other embodiments, there may be additional or fewer field lights. In other words, there can be any number of field lights mounted to the chassis 12, cab 16, cutter head 18, etc. In the illustrated example of FIG. 1, the first field light 106 may be mounted to a roof of the cab 16. The second field light 108 may be mounted to each side or only one side of the vehicle 10. The third field light 110 may be mounted to the rear of the chassis 12. The fourth field light 112 may be mounted to a front portion of the roof of the cab 16, and the fifth field light 114 may be mounted to a front deflector or portion of the chassis 12 below the cab 16. The location of each field light may differ on other vehicles or machines, and thus the example of FIG. 1 is only intended to illustrate an example of one lighting system 104.

The plurality of field lights may enable an aerial or overlapping illumination of a terrain or field surface surrounding the agricultural vehicle 10. One or more of the field lights can be activated individually and varied in terms of their luminous intensity by the vehicle controller 222 for adapting the emission characteristic or light intensity.

In addition to the actual lamp (Halogen or gas discharge lamp, LEDs or the like), one or more of the plurality of field lights may have optical devices for changing the emission characteristic, and consequently, the emission angle or the emission angle-dependent light distribution. The optical devices can be formed either by electrically controllable optical systems (collimators or lens systems), or else by the lamp itself. In the latter case, this may include a segmented LED matrix, in which individual matrix segments can be switched on and off and varied in their luminosity by the controller 222.

Inside the cab 16 may include a camera 100 for optically detecting the position or head posture of a vehicle operator. The information obtained by the camera 100 may be fed to the controller 222 to determine the instantaneous viewing direction of the vehicle operator using image processing software. The camera 100 may be integrated in a rear-view mirror or a housing 98, for example, covered by the rear-view mirror.

Figure 2:
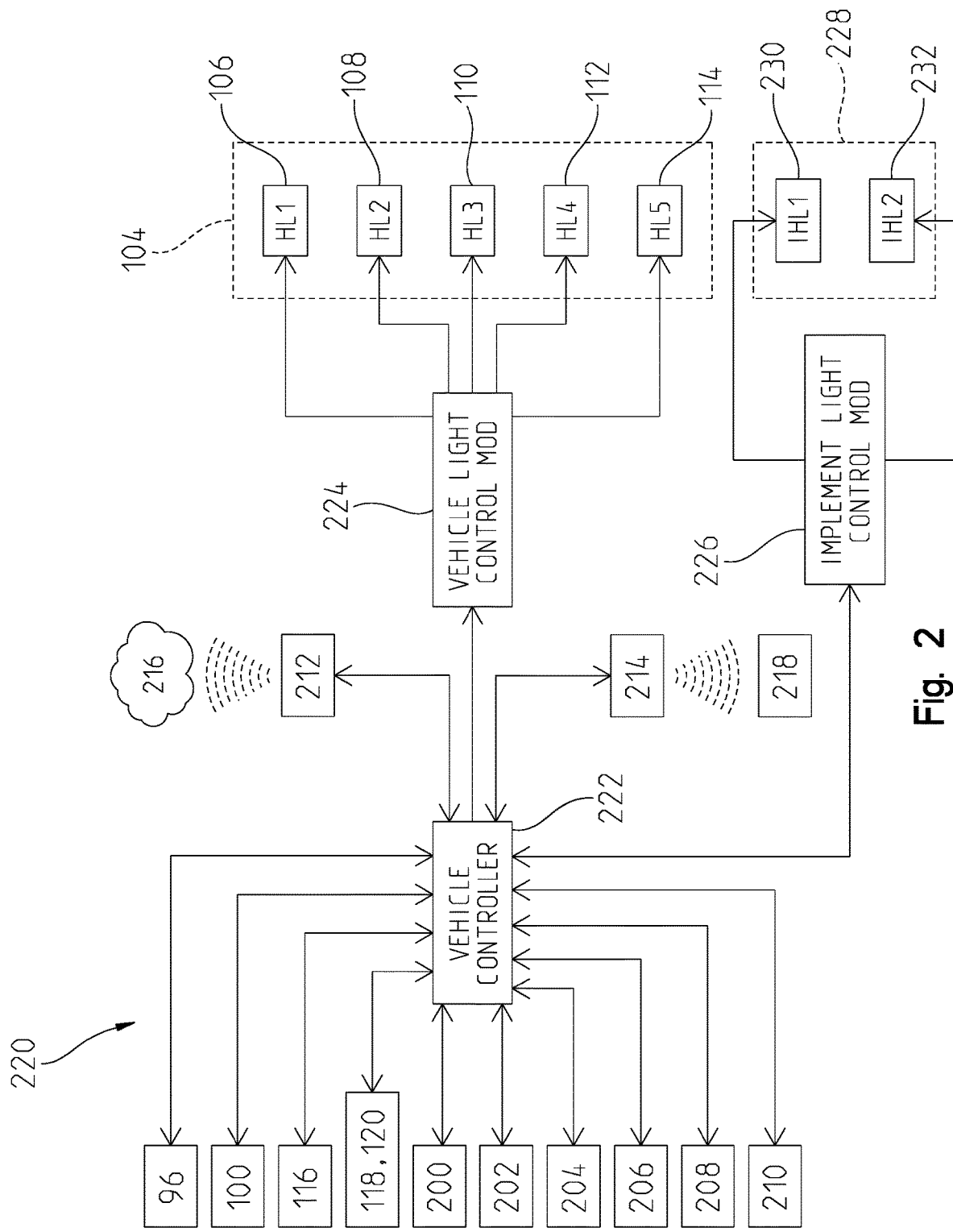
FIG. 2 is a schematic of a control system of the vehicle and lighting system of FIG. 1.

As shown in FIG. 2, the vehicle controller 222 may form part of a vehicle control system 220. Here, the controller 222 may include a data interface 212 for the wireless reception of position or other information broadcast by another work machine or vehicle (not shown). The position information broadcast by the other vehicle may be located in a data cloud 216 and can be retrieved from there via the data interface 212 using an existing wireless network.

On the basis of the position information received, the controller 222 can determine a relative position of the agricultural vehicle 10 with respect to another vehicle or an implement, for which purpose the controller 222 performs a comparison with position information in relation to the vehicle 10. The assessment or determination of the relative position may be carried out on the basis of a polar coordinate system, in which the vehicle 10 forms the origin of the coordinate system.

The position information related to the vehicle 10 may be captured by a satellite-based navigation system. The satellite-based navigation system can be either installed in the vehicle 10 or else implemented as a wireless device 218. The latter may be a component part of a mobile telephone of the vehicle operator, wherein the calculated position information is transmitted wirelessly to the controller 222 via an LTE connection established by a wireless interface 214.

In addition, in order to determine potential extraneous light effects, the controller 222 may be connected to an ambient-sensing light or image sensor. The light or image sensor may be a panorama or 360-degree camera 116 arranged in the roof area of the cab 16. Alternatively, it can also be light-sensitive sensor elements or individual cameras (not shown), distributed along an outer side of the vehicle 10.

Besides the lighting system 104 and cameras, the agricultural vehicle 10 may include one or more sensors for detecting a relative position of the vehicle to another object. For example, a first proximity sensor 118 may be mounted to the front side of the vehicle 10 and a second proximity sensor 120 may be mounted to the rear side thereof. Each sensor may be in electrical communication with the controller 222, as shown in FIG. 2. The first sensor 118 may detect an object in front of the vehicle as it travels in a forward direction, whereas the second sensor 120 may detect an object either approaching from behind or an object in the path of rearward movement of the vehicle 10. The vehicle 10 may include additional sensors for detecting the position of the vehicle relative to surrounding objects and provide corresponding feedback to the controller 222.

The controller 222 may be in a position where it receives data and other feedback from the operator of the vehicle along with sensors, cameras, remote devices, and the like across the vehicle and implement. In the example of FIG. 2, the controller 222 may be arranged to receive a plurality of inputs. For instance, the controller may receive communication from the operator terminal 96 in the form of commands or instructions from the operator. This may include instructions to accelerate, decelerate, or turn the tractor. Alternatively, this may include to active or de-activate the lighting system 104. Further, it may include commands to operate the vehicle according to a desired mode or setting. Other known operator commands may be communicated to the controller 222 via the operator terminal 96.

The controller 222 may also receive images or other communications from the camera 100 located in the cab 16 of the vehicle. The camera may detect movement of the operator and communicate the same to the controller 222. While a camera is depicted in FIG. 1, the camera 100 may also comprise a sensor for detecting a characteristic of the vehicle from inside the cab 16.

The controller 222 may further receive communication from the camera 116 located externally of the cab 16. Here, the camera 116 may detect environmental conditions such as dusk or dawn, lighting effects from the lighting system 104, along with a view of the area around the work vehicle 10. This may include objects or obstacles in a field, a fence line, a roadway, or other on-road or off-road vehicles in the general area. Further, the camera 116 may detect an implement being towed by the work machine and communicating this to the controller 222. In one example, the camera 116 may provide images to the controller 222, which in turn may communicate these images to the operator as will be described further below.

The controller 222 may be in communication with the first and second proximity sensors 118, 120. The sensors may communicate objects that are within a predefined distance of the vehicle 10. This may include other vehicles or an implement being towed by the work vehicle in the field, or on a roadway during transport.

In this disclosure, the term "work vehicle" may include the type of work vehicle depicted in FIG. 1. However, this disclosure is not intended to be limiting. "Work vehicle" may generally be any vehicle or machine capable of operating or performing a work function. Thus, an implement is considered a "work vehicle" for purposes of this disclosure. As such, the use of "work vehicle" and "implement" in this disclosure is not intended to be limiting, and any work vehicle may be an implement and any implement may be a work vehicle. Moreover, a self-propelled unit such as a tractor, sprayer, combine, etc. may be described herein as a work vehicle, as well as an implement towed by a tractor or other vehicle may also be referred to as a work vehicle.

As shown in FIG. 2, the controller 222 may receive communications from one or more sensors 200 regarding an operating status, operating position, or diagnostic trouble codes (DTCs) related to the vehicle. These sensors 200 may communicate warnings in the form of DTCs to the operator such as, but not limited to, low battery level, low fuel, etc.

The controller 222 may receive communications from a field map input 202 which may include positional information relative to a field. This information may be determined and loaded into a memory unit of the controller 222, or it may be communicated from a remote source. The information from the field map input 202 may include field boundaries, roadways, fence lines, obstacles to avoid, etc. This information may be provided to the controller 222, which can then provide this information to the operator during field operation.

The controller 222 may also be in communication with a global positioning sensor (GPS) input 204. The GPS input 204 may come from a satellite or other remote sensing device (e.g., a cell phone). The GPS input 204 may provide a location of the vehicle 10 to the operator so that the operator is able to determine where in the field the vehicle is located.

A vehicle speed input 206 may provide vehicle speed to the controller 222. An operation mode type input 208 may provide the operator with details related to what type of operating mode a towed implement or the cutter head 18 is in. For an agricultural sprayer, for example, the operation mode type input 208 may signal when a sprayer boom of the sprayer is folded, which is indicative of a transport mode, or unfolded, which is indicative of a field or working mode.

Other sensors 210 may be in communication with the controller 222 to provide performance data or information about the vehicle or implement. This performance data or information may include any data that is generally collected, monitored, displayed, calculated, etc. and provided to the operator to better control the operation of the vehicle or implement.

As shown in FIG. 2, the work vehicle 10 may be capable of towing an implement. For instance, the work vehicle may be a tractor which tows a mowing, planting or spraying implement. In any event, the implement may include its own lighting system. The implement lighting system may be operably controlled by the vehicle controller 222 in the same way as the vehicle lighting system 104. In another embodiment, the implement lighting system may be operably controlled via the vehicle light control module 224.

In yet another embodiment, which is shown in FIG. 2, the implement lighting system may include its own implement light control module 226 for operably controlling the implement lighting system. Here, the implement lighting system 228 may include a first implement array field light 230 and a second LED array implement field light 232. The implement lighting system 228 may include one or more array field lights for projecting a light emission externally from the implement to illuminate areas around the implement.

As described above, conventional lighting systems were controlled to either be turned completely on or off. If a high beam and low beam were available, then a high beam may be used to further illuminate the surrounding environment compared to the low beam. When an oncoming vehicle is detected, the high beam may be switched to the low beam. In doing so, the operator of the oncoming vehicle is not blinded by the light emission of the high beam.

In this disclosure, the light control module 224 of the vehicle and/or the implement light control module 226 may receive communications from the controller 222 and operably control individual pixel segments to project or display light emissions from each of its individual array field lights. Each array field light may be operably controlled independently of the other field lights such that at any given time one or more of the field lights may be operably controlled on or off. As a result, if an oncoming vehicle is approaching, individual pixel segments may be disabled without completing shutting off the entire field light. This can provide advantages such that the surrounding environment may still be illuminated by the lighting system, but the operator of the oncoming vehicle is not blinded. The ability to control the lighting system of the vehicle and implement via matrix lighting technology, along with camera and/or sensor technology to detect the presence of an oncoming vehicle and the like, provides additional benefits over conventional lighting systems.

In the same way, if the operator controlling the work vehicle is distracted or partially blinded due to a glare caused by the lighting system, the present disclosure provides a control system and method for turning off segments of light to reduce the glare and distractions from the operator.

To achieve the aforementioned benefits, the present disclosure provides a high-definition pixel and/or pixel LED lighting system to expand the overall coverage zone of illumination around the work vehicle and implement. This lighting system may improve the visibility of the work vehicle and implement to the operator and to others in or near the coverage zone, particularly as more work vehicles are operating later at night. The lighting system may be operably controlled via control system to that shown in FIG. 2 where individual array field lights may be selectively controlled to modify the light emission therefrom.

In one example of this disclosure, a combination of a combine 10 and grain cart (not shown) may be in the same coverage zone. A camera or sensor may detect the presence of the grain cart such that the lighting system on the combine is operably controlled so that a corresponding array field light does not project a light emission directly at the grain cart operator. Similarly, a lighting system on the grain cart may be operably controlled so that a corresponding array field light does not project a light emission directly at the combine operator. The combination of both lighting systems, however, project sufficient light emission around the respective work vehicles for others to see.

In another example, a pair of tractors may be working in the same field. Each tractor may include a camera or sensor for detecting the presence of the other tractor. Upon doing so, the respective controllers may operably control the lighting systems on each tractor so as not to blind the operators of each tractor.

In the previous examples, it may also be possible for the operator of the combine, grain cart, or either tractor to manually identify the other vehicle and/or control the lighting system so as not to blind the operator of the other vehicle.

In yet another example, a fast strobe sequence of all array field lights may be implemented to help illuminate the work vehicle so that another vehicle in the field or otherwise may clearly see the work vehicle. The fast strobe sequence may utilize a rotation of a field light, flashing, or any other type of lighting sequence.

In a further example, a lighting system of a work vehicle may be interfaced with a lighting system on a towed implement. For instance, a tractor may be pulling a planter through a field such that the tractor lighting system and planter lighting system project light emissions from each array field light to illuminate the field in which they are operating. In this example, the vehicle controller may operably control the planter lighting system to illuminate the field and then operably control the tractor lighting system to illuminate those zones or areas not illuminated by the planter lighting system. The use of matrix lighting may be implemented where individual pixel segments of each array field light may be controlled on to fill in the gaps left by the planter lighting system. The same may be true with using the planter lighting system to fill in gaps not illuminated by the tractor lighting system.

In this most recent example, as the tractor and implement make a turn in the field, logic in the vehicle controller may be executed to control the tractor lighting system and the implement lighting system to cover the intended path of travel through the turn.

Similarly, in another example, a tractor may be towing a mower implement through a field. As the mower moves from one side of the tractor to the other, the controller may operably control the lighting system on the tractor to illuminate the path of the mower as it moves from one side to the other.

In the present disclosure, an improved wireless communication protocol such as light fidelity ("Li-Fi") may be utilized to improve communication between work vehicles or machines, work vehicle and implement, and the like. Li-Fi is a known wireless communication technology which uses light to transmit data and position between devices. Moreover, Li-Fi is a light communication system capable of transmitting data at high speeds over visible light, ultraviolet, and infrared spectrums. Typically, LED lamps may be used to transmit visible light.

In use, Li-Fi uses the modulation or pulsing of light intensity to transmit data at high speeds and in environments where electromagnetic interference does not affect its transmission performance. Generally, a Li-Fi system includes at least one receiver and one transmitter. There is an established or known communication protocol or language between the two such that pulsing light signals via the transmitter is received by the receiver, and the receiver is capable of interpreting the signals or transferring the signals to another device (e.g., a control system).

In one example, a light-transmitting module on a roof of a work vehicle such as a tractor may be used to communicate with a receiver module on an implement such that the tractor is capable of communicating with the implement via Li-Fi. The light-transmitting module may transmit light which is received and interpreted by the receiver module but which may not be detectable by a human eye. For instance, the light-transmitting module may pulse light at 50 kHz. This form of communication is desirable particularly where a wired communication is unavailable and when it is necessary to transmit information at a higher bandwidth than is possible with a radio transmission receiver.

Figure 3:
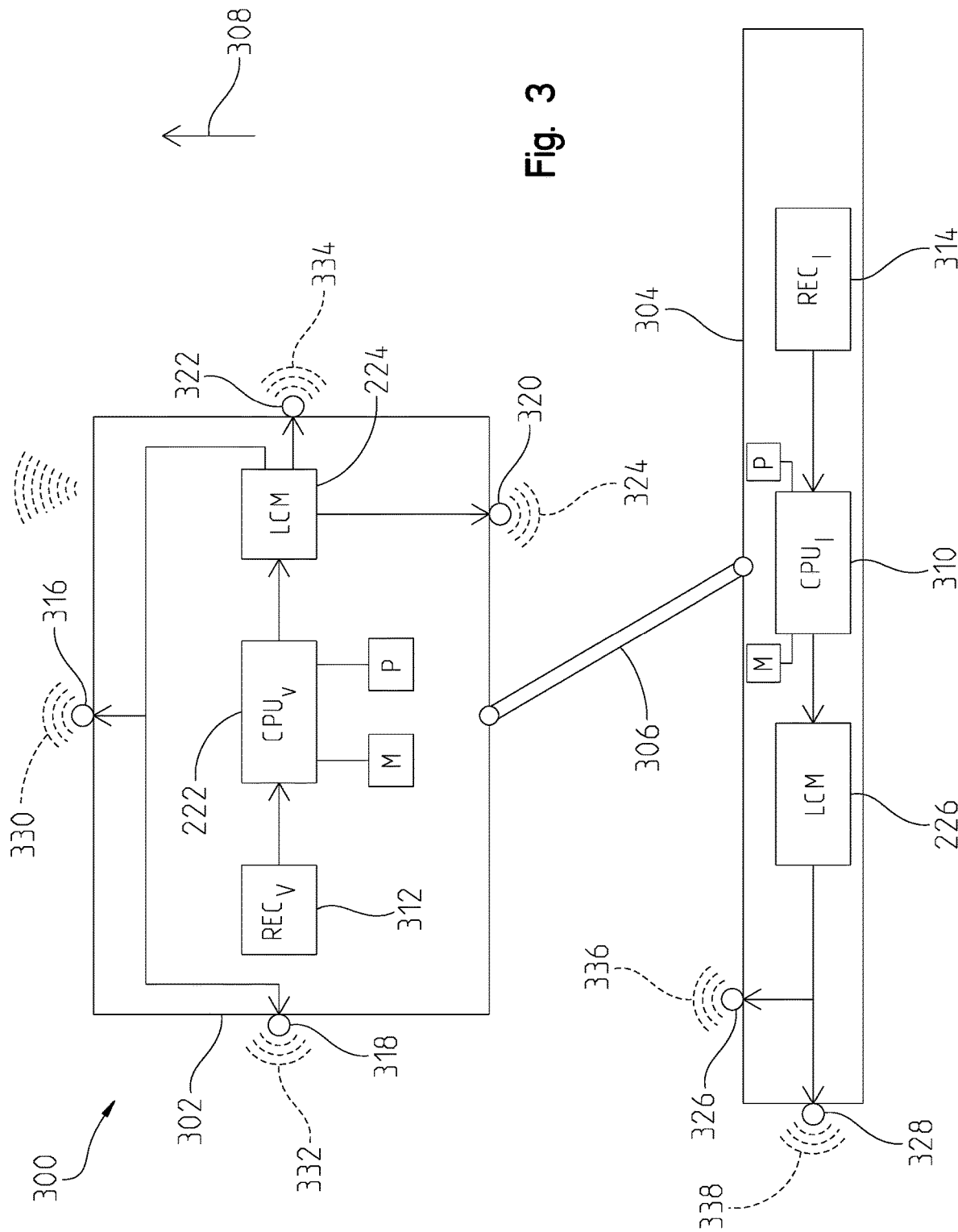
FIG. 3 is a schematic of an agricultural vehicle and implement operating in a field.

In one such embodiment, a work vehicle and implement may be capable of utilizing Li-Fi communication to share data and position information therebetween. In FIG. 3, for example, a work vehicle-implement combination 300 may communicate with one another via a Li-Fi communication system. The combination 300 may include a work vehicle such as a tractor 302 and an implement 304. A drawbar 306 may be used to connect the tractor 302 and implement 304 to one another. The tractor 302 may operate in a forward travel direction defined by arrow 308 in FIG. 3.

The tractor 302 may include a vehicle controller 222 and light control module 224 similar to those described relative to FIG. 2. The controller 222 may include a memory unit (M) and a processor (P), where the memory unit is capable of storing data, lookup tables, software, control algorithms, and the like. The tractor 302 may also include a receiving module 312 capable of receiving light emissions or signals from a light-transmitting module. In one example, the receiving module 312 may be in the form of a photodetector. The receiving module 312 may include or be electrically coupled to a signal converter (not shown) which may convert the light signals into a format which is capable of being interpreted by the vehicle controller 222 or light control module 224. In this example, the signal converter may be an externally-located module from the receiving module 312, vehicle controller 222 and light control module 224. Alternatively, the signal converter may be part of the receiving module 312, vehicle controller 222 or light control module 224.

The tractor 302 may include a plurality of field lights or light-transmitting modules. Each light-transmitting module may include one or more LEDs with a visible light communication (VLC) technology to perform optical data transmission. In FIG. 3, for example, the plurality of light-transmitting modules may include a first light-transmitting module 316, a second light-transmitting module 318, a third light-transmitting module 320, and a fourth light-transmitting module 322.

Each light-transmitting module is capable of emitting or transferring a light signal. In the example of FIG. 3, the first light-transmitting module 316 may emit a first light signal 330. The vehicle controller 222 may communicate with the light control module 224 a type of data or position information to be emitted by the first light-transmitting module 316. As such, the light control module 224 may send instructions or commands to the first light-transmitting module 316 to communicate via light the instruction or command. In doing so, the first light-transmitting module 316 emits the first light signal 330 which includes the data or position information as instructed by the vehicle controller 222 in this example.

The second light-transmitting module 318 can be operably controlled to emit a second light signal 332. Similarly, the third light-transmitting module 320 can be operably controlled to emit a third light signal 324 and the fourth light-transmitting module 322 can be operably controlled to emit a fourth light signal 334. Each light-transmitting module may be operably controlled independently of one another. The light-transmitting modules may be located at different positions on the work vehicle 302, and the light control module 224 may instruct each light-transmitting module to transmit a different signal simultaneously or at different times.

In one embodiment, the implement 304 may be operably controlled via its own implement controller 310. Alternatively, the vehicle controller 222 may operably control a work function of the implement 304. The implement controller 310 may include a memory unit (M) and a processor (P). Further, the implement 304 may include the implement light control module 224 which is in electrical communication with the implement controller 310 (or vehicle controller 222 as in FIG. 2).

The implement 304 may include a receiving module 314 capable of receiving light emissions or signals from a light-transmitting module from the tractor 302 (or other machine). In one example, the receiving module 314 may be in the form of a photodetector. The receiving module 314 may include or be electrically coupled to a signal converter (not shown) which may convert the light signals into a format which is capable of being interpreted by the vehicle controller 222 or implement light control module 226. In this example, the signal converter may be an externally-located module from the receiving module 314, vehicle controller 222 and implement light control module 226. Alternatively, the signal converter may be part of the receiving module 314, vehicle controller 222 or implement light control module 226.

The implement 304 may include a plurality of field lights or light-transmitting modules. Each light-transmitting module may include one or more LEDs with a visible light communication (VLC) technology to perform optical data transmission. In FIG. 3, for example, the plurality of light-transmitting modules may include a first implement light-transmitting module 326 and a second implement light-transmitting module 328.

Each implement light-transmitting module is capable of emitting or transferring a light signal. In the example of FIG. 3, the first implement light-transmitting module 326 may emit a first light signal 336. The vehicle controller 222 may communicate with the implement light control module 226 a type of data or position information to be emitted by the first implement light-transmitting module 326. As such, the implement light control module 226 may send instructions or commands to the first implement light-transmitting module 326 to communicate via light the instruction or command. In doing so, the first implement light-transmitting module 326 emits the first light signal 336 which includes the data or position information as instructed by the vehicle controller 222 in this example.

The second implement light-transmitting module 328 may emit a second light signal 338 as shown in FIG. 3. Each light signal from the implement light-transmitting modules may be operably received by the receiving module 312 on the tractor 302 and/or another receiving module located on a different work vehicle or implement. Upon receiving a light signal from the implement 304, the receiving module 312 may transmit the signal to a signal converter which may in turn convert the light signals into a format which is capable of being interpreted by the vehicle controller 222 or implement light control module 226. In this way, the vehicle controller 222 may communicate with the operator of the tractor or work machine data or position information related to the implement 304.

Similarly, one or more of the light-transmitting modules of the tractor 302 may emit a light signal which is received by the implement receiving module 314. The implement receiving module 314 may transmit the signal to a signal converter which in turn converts the light signal into a format that may be received and understood by the implement controller 310. As noted above, the signal converter may be a part of the receiving module or a separate unit therefrom.

In one embodiment, the light-transmitting modules on the tractor and/or implement may comprise the field lights used to illuminate the areas surrounding the respective machine. Moreover, during operation, one or more of the implement light-transmitting modules may pulse infrared light to the tractor so that a glare or blinding light is not emitted in such a way that it affects the operator's ability to control the tractor. Further, light signals may be emitted or pulsed from the tractor via infrared light.

The use of Li-Fi technology is ideal in these circumstances where it is not possible to have a wired connection between transmitter and receiver. Further, it is desired where a larger bandwidth is needed to communicate therebetween. For example, in one embodiment, the communication between the tractor or work vehicle and implement may be via a first wireless communication protocol or a second wireless communication protocol. The second wireless communication protocol may utilize Li-Fi technology. In one aspect, the first wireless communication protocol may be the default communication protocol. However, the vehicle controller 222 or implement controller 310 may be programmed to detect when the amount of bandwidth available with the first wireless communication protocol is insufficient for the amount of data or information being transferred between the work vehicle 302 and implement 304. When this is detected, the communication protocol may be switched from the first wireless communication protocol to the second wireless communication protocol. In this case, the vehicle controller 222 or implement controller 310 may operably trigger the communication to switch to Li-Fi and thus the communication therebetween is via the light-transmitting modules and receiving modules as described above.

In the aforementioned example, the vehicle controller 222 may continuously monitor the bandwidth being used relative to the amount of bandwidth available between the work vehicle 302 and implement 304. The same may be true with respect to communication between the work vehicle 302 and another work vehicle in a field or other location. The vehicle controller 222 may be programmed to detect the bandwidth used versus available bandwidth, compare the amount of bandwidth used or available to a threshold amount, and operably switch between communication protocols when additional or less bandwidth is needed. For example, when the amount of bandwidth being used at any given time is less than the bandwidth threshold, the vehicle controller 222 may communicate via a first wireless communication protocol with less bandwidth. When the amount of bandwidth being used at any given time is more than the bandwidth threshold, the vehicle controller 222 may switch to a second wireless communication protocol with more bandwidth. As the controller 222 switches to the second wireless communication protocol, the vehicle controller 222 may communicate with the light control module 224 to send a light signal via one or more of the vehicle light-transmitting modules to the implement receiving module 314 indicating the switch to the second wireless communication protocol. Moreover, when switching back to the first wireless communication protocol, the vehicle controller 222 may use the light control module 224 to send a light signal indicative of this switch to the implement receiving module 314 which is communicated to the implement controller 310.

Figure 4:
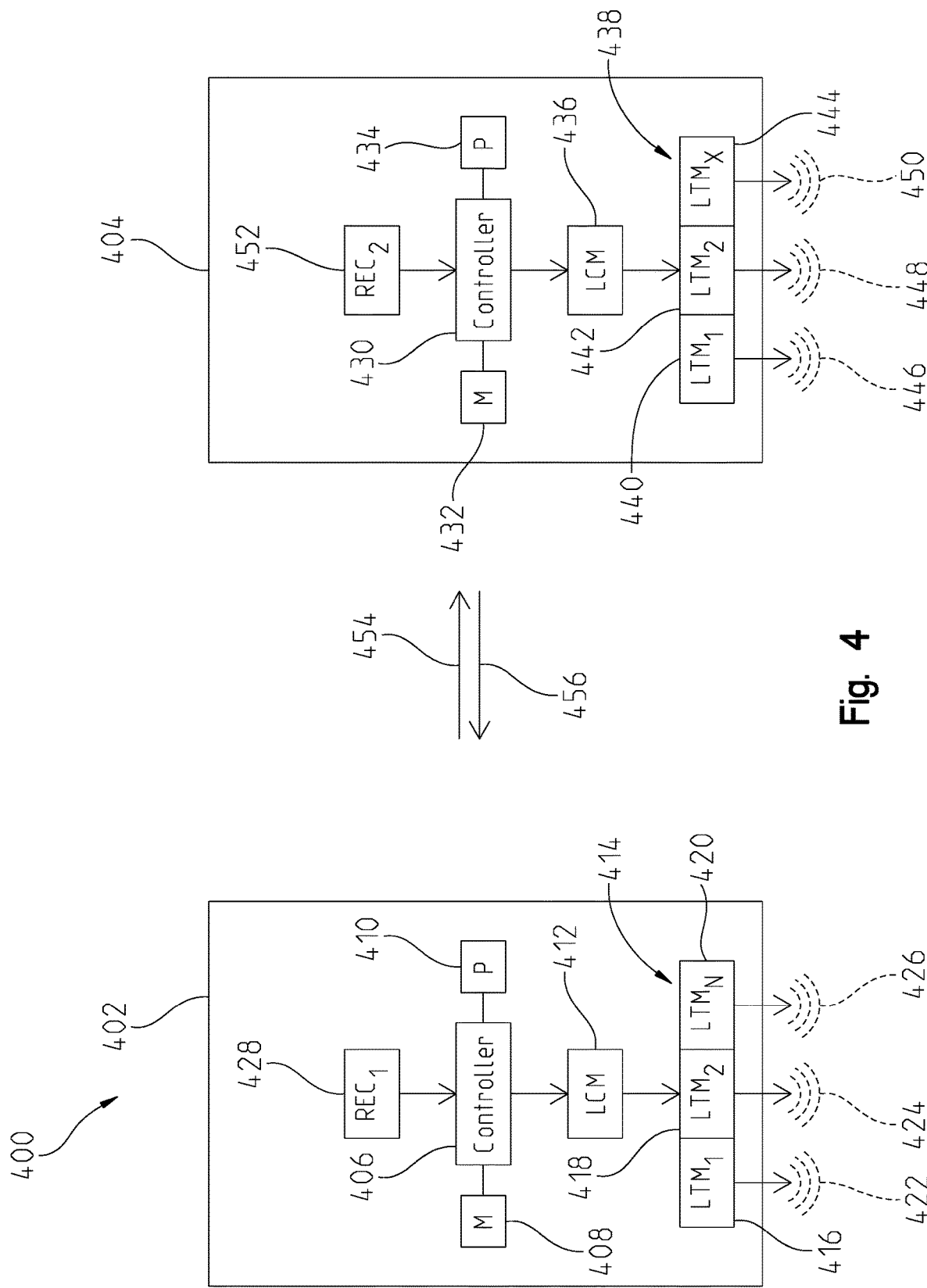
FIG. 4 is a schematic of a pair of work machines with Li-Fi communication systems for communicating with one another.

Referring now to FIG. 4, a further embodiment of the present disclosure is disclosed. In FIG. 3, the embodiment illustrates a work vehicle pulling an implement. As described above, the work vehicle and implement are configured to communicate with one another via light signals emitted and received therebetween. In FIG. 4, a combination 400 of a pair of work machines or implements are shown which are capable of communicating with one another via Li-Fi communication to share data and position information therebetween. The combination 400 may include a first work vehicle 402 and a second work vehicle 404. The first work vehicle 402, however, may be an implement. Similarly, the second work vehicle 404 may be an implement. Thus, it is possible for a pair of implements to communicate with one another utilizing Li-Fi communication.

The first work vehicle 402 may include a controller 406 and light control module 412 similar to those described relative to FIG. 2. The controller 406 may include a memory unit (M) 408 and a processor (P) 410, where the memory unit 408 is capable of storing data, lookup tables, software, control algorithms, and the like. The first work vehicle 402 may also include a receiving module 428 capable of receiving light emissions or signals from a light-transmitting module. In one example, the receiving module 428 may be in the form of a photodetector. The receiving module 428 may include or be electrically coupled to a signal converter (not shown) which may convert the light signals into a format which is capable of being interpreted by the controller 406 or light control module 412. In this example, the signal converter may be an externally-located module from the receiving module 428, controller 406 and light control module 412. Alternatively, the signal converter may be part of the receiving module 428, controller 406 or light control module 412.

The first work vehicle 402 may include a lighting system 414 similar to the lighting system 104 of FIGS. 1 and 2. The lighting system 414 may comprise a plurality of field lights or light-transmitting modules. Each light-transmitting module may include one or more LEDs with a visible light communication (VLC) technology to perform optical data transmission. In FIG. 4, for example, the plurality of light-transmitting modules may include a first light-transmitting module 416, a second light-transmitting module 418, and a third light-transmitting module 420. There may be any number of light-transmitting modules, and thus FIG. 4 is only one type of example. In other words, there can be more or more light-transmitting modules functioning as part of the lighting system 414.

Each light-transmitting module is capable of emitting or transferring a light signal. In the example of FIG. 4, the first light-transmitting module 416 may emit a first light signal 422. The controller 406 may communicate with the light control module 412 a type of data or position information to be emitted by the first light-transmitting module 416. As such, the light control module 412 may send instructions or commands to the first light-transmitting module 416 to communicate via light the instruction or command. In doing so, the first light-transmitting module 416 emits the first light signal 422 which includes the data or position information as instructed by the controller 406 in this example.

The second light-transmitting module 418 can be operably controlled to emit a second light signal 424. Similarly, the third light-transmitting module 420 can be operably controlled to emit a third light signal 426. Each light-transmitting module may be operably controlled independently of one another. The light-transmitting modules may be located at different positions on the work vehicle 402, and the light control module 412 may instruct each light-transmitting module to transmit a different signal simultaneously or at different times.

In FIG. 4, the second work vehicle 404 may be operably controlled via its own controller 430. Alternatively, the first controller 406 may operably control a work function of the second work vehicle 404. The controller 430 may include a memory unit (M) 432 and a processor (P) 434. Further, the second work vehicle 404 may include a light control module 436 which is in electrical communication with the controller 430 (or first controller 406).

The second work vehicle 404 may include a receiving module 452 capable of receiving light emissions or signals from a light-transmitting module from the first work vehicle 402 (or other machine). In one example, the receiving module 452 may be in the form of a photodetector. The receiving module 452 may include or be electrically coupled to a signal converter (not shown) which may convert the light signals into a format which is capable of being interpreted by the controller 430 or light control module 436. In this example, the signal converter may be an externally-located module from the receiving module 452, controller 430 and light control module 436. Alternatively, the signal converter may be part of the receiving module 452, the controller 430 or the light control module 436.

The second work vehicle 404 may include its own lighting system 438 comprising a plurality of field lights or light-transmitting modules. Each light-transmitting module may include one or more LEDs with a visible light communication (VLC) technology to perform optical data transmission. In FIG. 4, for example, the plurality of light-transmitting modules may include a first light-transmitting module 440, a second light-transmitting module 442, and a third light-transmitting module 444.

Each light-transmitting module is capable of emitting or transferring a light signal. In the example of FIG. 4, the first light-transmitting module 440 may emit a first light signal 446. The second controller 430 may communicate with the light control module 436 a type of data or position information to be emitted by the first light-transmitting module 440. As such, the light control module 436 may send instructions or commands to the first light-transmitting module 440 to communicate via light the instruction or command. In doing so, the first light-transmitting module 440 emits the first light signal 446 which includes the data or position information as instructed by the second controller 430 in this example.

The second light-transmitting module 442 may emit a second light signal 448 as shown in FIG. 4, and the third light-transmitting module 444 may emit a third light signal 450. Each light signal from the one or more light-transmitting modules may be operably received by the receiving module 428 on the first work vehicle 402 and/or another receiving module located on a different work vehicle or implement. Upon receiving a light signal from the second work vehicle 404, the receiving module 428 may transmit the signal to a signal converter which may in turn convert the light signals into a format which is capable of being interpreted by the first controller 406 or light control module 412. In this way, the first controller 406 may communicate with the operator of the first work machine 402 data or position information related to the second work vehicle 404.

Similarly, one or more of the light-transmitting modules of the first work vehicle 402 may emit a light signal which is received by the receiving module 452 on the second work vehicle 404. The second receiving module 452 may transmit the signal to a signal converter which in turn converts the light signal into a format that may be received and understood by the controller 430. As noted above, the signal converter may be a part of the receiving module or a separate unit therefrom.

In this embodiment, light signals may be emitted from the first work vehicle 402 to the second work vehicle 404 in a first communication direction 454, and/or light signals may be emitted from the second work vehicle 404 to the first work vehicle 402 in a second communication direction 456.

In one embodiment, the light-transmitting modules on either work vehicle may comprise the field lights used to illuminate the areas surrounding the respective machine. Moreover, during operation, one or more of the light-transmitting modules may pulse infrared light to the other work vehicle so that a glare or blinding light is not emitted in such a way that it affects the operator's ability to control the other work vehicle.

The use of Li-Fi technology is ideal in these circumstances where it is not possible to have a wired connection between transmitter and receiver. Further, it is desired where a larger bandwidth is needed to communicate therebetween. For example, in one embodiment, the communication between the two work vehicles may be via a first wireless communication protocol or a second wireless communication protocol. The second wireless communication protocol may utilize Li-Fi technology. In one aspect, the first wireless communication protocol may be the default communication protocol. However, the first controller 406 or the second controller 430 may be programmed to detect when the amount of bandwidth available with the first wireless communication protocol is insufficient for the amount of data or information being transferred between the first work vehicle 402 and second work vehicle 404. When this is detected, the communication protocol may be switched from the first wireless communication protocol to the second wireless communication protocol. In this case, the first controller 406 or second controller 430 may operably trigger the communication to switch to Li-Fi and thus the communication therebetween is via the light-transmitting modules and receiving modules as described above.

In the aforementioned example, the first controller 406 may continuously monitor the bandwidth being used relative to the amount of bandwidth available between the first work vehicle 402 and second work vehicle 404. The same may be true with respect to communication between the first or second work vehicle and another work vehicle or implement in a field or other location. Either controller 406, 430 may be programmed to detect the bandwidth used versus available bandwidth, compare the amount of bandwidth used or available to a threshold amount, and operably switch between communication protocols when additional or less bandwidth is needed. For example, when the amount of bandwidth being used at any given time is less than the bandwidth threshold, the respective controller may communicate via a first wireless communication protocol with less bandwidth. When the amount of bandwidth being used at any given time is more than the bandwidth threshold, the respective controller 406, 430 may switch to a second wireless communication protocol with more bandwidth. As the respective controller 406, 430 switches to the second wireless communication protocol, the respective controller 406, 430 may communicate with the respective light control module 412, 436 to send a light signal via one or more of the vehicle light-transmitting modules to the respective receiving module 428, 452 indicating the switch to the second wireless communication protocol. Moreover, when switching back to the first wireless communication protocol, the respective controller 406, 430 may use the respective light control module 412, 436 to send a light signal indicative of this switch to the respective receiving module 428, 452 which is communicated to the respective controller 406, 430.

As described above, the first work vehicle 402 may be a tractor, implement, or any other type of work machine. Likewise, the second work vehicle 404 may be a tractor, implement, or any other type of work machine.

In this disclosure, LED technology is covered but is not intended to be limiting. Other lighting technologies may be used as well including laser, DLP, a combination of LED and other, etc. Each light may be an array field light or light source.

In this disclosure, a plurality of sensing device technologies is described including proximity sensors and camera-based technology. Other sensing technologies such as LIDAR, infrared, radar, etc. may also be used.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An agricultural work vehicle, comprising:
   a chassis;
   a cab mounted to the chassis;
   a controller for controlling operation of the work vehicle;
   a first receiving module disposed in electrical communication with the controller, the first receiving module configured to communicate with a light-transmitting module on another work vehicle;
   a lighting system comprising one or more field lights coupled to the work vehicle, the one or more field configured to illuminate an area on or adjacent to the work vehicle;
   a light control module disposed in electrical communication with the controller, the light control module configured to operably control the one or more field lights;
   wherein the one or more field lights transmits a first light signal based on a signal from the controller, the first light signal configured to be received by another work vehicle, and
   wherein the first receiving module is configured to receive a response light signal from the another work vehicle and communicates the response light signal to the controller;
   wherein the controller communicates the response light signal to an operator interface in the cab.

2. The agricultural work vehicle of claim 1, wherein the one or more field lights comprises a high-definition pixel LED lighting module.

3. The agricultural work vehicle of claim 1, wherein the transmission of the first light signal comprises an optical data transmission.

4. The agricultural work vehicle of claim 1, wherein the one or more field lights is coupled to the cab or chassis.

5. The agricultural work vehicle of claim 1, wherein the one or more field lights comprises a first field light and a second field light, the first and second field lights being independently controllable by the light control module.

6. The agricultural work vehicle of claim 5, wherein the first field light is operably controlled to transmit a first field light signal and the second field light is operably controlled to transmit a second field light signal, the first field light signal and second field light signal comprising different information.

7. The agricultural work vehicle of claim 1, wherein the first receiving module comprises a photodetector.

8. The agricultural work vehicle of claim 1, further comprising a signal converter electrically coupled to the first receiving module, the signal converter configured to convert the response light signal into a readable format by the controller.

9. A work vehicle and implement combination for operating in a field, comprising:
   a controller for controlling the work vehicle;
   a receiving module disposed in electrical communication with the controller, the receiving module configured to receive one or more light signals from the implement;
   a lighting system comprising at least one light-transmitting module;
   a light control module disposed in electrical communication with the controller, the light control module configured to operably control the at least one light-transmitting module;
   wherein, based on a signal from the controller, the at least one light-transmitting module transmits a first light signal to the implement and, in response to receipt of the first light signal by the implement, the receiving module receives a response light signal transmitted by the implement.

10. The work vehicle and implement combination of claim 9, wherein the response light signal comprises data or position information about the implement.

11. The work vehicle and implement combination of claim 9, wherein the transmission of the first light signal comprises an optical data transmission.

12. The work vehicle and implement combination of claim 9, wherein the at least one light-transmitting module comprises a first light-transmitting module and a second light-transmitting module, the first and second light-transmitting modules being independently controllable by the light control module.

13. The work vehicle and implement combination of claim 12, wherein the first light-transmitting module is operably controlled to transmit the first light signal and the second light-transmitting module is operably controlled to transmit a second light signal, the first light signal and second light signal comprising different information.

14. The work vehicle and implement combination of claim 9, wherein the receiving module comprises a signal converter configured to convert the response light signal received from the implement into a readable format for the controller.

15. The work vehicle and implement combination of claim 9, wherein the implement comprises an implement receiving module and an implement light-transmitting module, the implement receiving module configured to receive the first light signal and the implement light-transmitting module configured to transmit the response light signal.

16. The work vehicle and implement combination of claim 15, wherein the implement light-transmitting module is operably controlled to pulse an infrared light signal.

17. The work vehicle and implement combination of claim 9, wherein the at least one light-transmitting module comprises one or more field lights, the controller operably controlling the one or more field lights to illuminate the implement or an area adjacent to the implement.

18. The work vehicle and implement combination of claim 9, wherein the at least one light-transmitting module is operably controlled by the light control module to pulse an infrared light signal to the implement.

\* \* \* \* \*